(12) United States Patent
Takada et al.

(10) Patent No.: US 6,972,759 B2
(45) Date of Patent: Dec. 6, 2005

(54) IMAGE MATCHING DEVICE

(75) Inventors: Masatoshi Takada, Hitachi (JP); Kenji Araki, Mito (JP); Koushi Sakata, Hitachi (JP); Chikara Takeuchi, Hitachi (JP); Masakazu Hisatsune, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 199 days.

(21) Appl. No.: 10/191,283

(22) Filed: Jul. 10, 2002

(65) Prior Publication Data

US 2003/0011593 A1 Jan. 16, 2003

Related U.S. Application Data

(63) Continuation of application No. 10/100,179, filed on Mar. 19, 2002, now abandoned.

(30) Foreign Application Priority Data

Jul. 11, 2001 (JP) .............................. 2001-210968

(51) Int. Cl.[7] ............................................ G06T 17/00
(52) U.S. Cl. ..................................... 345/420
(58) Field of Search ..................... 345/420; 382/141, 382/154; 348/86, 192; 700/98

(56) References Cited

FOREIGN PATENT DOCUMENTS

| JP | 08-014860 | * 1/1996 | .......... G01B 11/24 |
| JP | 9-81778 | 3/1997 | |

* cited by examiner

*Primary Examiner*—Almis R. Jankus
(74) *Attorney, Agent, or Firm*—Crowell & Moring LLP

(57) ABSTRACT

An image matching device for extracting differences between an image taken of an actual object and model data with high accuracy. The image matching device includes a model data storage unit for storing model data of a layout of component parts of a plant, an image data storage unit for storing, for example, data of images taken of the plant, a parts library containing data on parts, heat insulating material library containing information of heat insulating materials, a model correcting unit, and a matching unit. The model correcting unit produces, based on model data and parts data, synthesized image data of an image viewed from the same position and in the same direction as actual image data is obtained by taking a photo of the plant. The matching unit matches a synthesized image to a real image.

4 Claims, 7 Drawing Sheets

FIG.3

| ID | KIND OF PART | PART OR EQUIPMENT TYPE | REFERENCE POINT 1 | REFERENCE POINT 2 | REFERENCE POINT 3 | DI-AMETER | MODEL | SERVICE OR USE CONDITION | HEAT INSULATING MATERIAL THICKNESS |
|---|---|---|---|---|---|---|---|---|---|
| 1X-ES-25-0027P | PIPE | | (12000,15000,7600) | (12000,15000,9100) | | 400 | | T=120,v=80 | |
| 1X-ES-25-0028E | ELBOW | | (12000,15000,7000) | (12000,15000,9100) | (12600,15000,7000) | 400 | | T=120,v=80 | |
| 1X-C-16-0014P | PIPE | | (8200,10600,21000) | (8200,11600,22000) | | 750 | | T=30,P=14 | |
| 1X-ES-25-0030V | VALVE | SAFETY | (1500,28800,1200) | (1800,28000,1200) | | 50 | SEAFL50A | T=80,P=0.4,v=20 | |
| 1X-TB-008 | CONC | FLOOR | (3000,2000,500) | (21000,17000,1500) | | | | | |

| PHOTO-TAKING POSITION (21) | PHOTO-TAKING DIRECTION (22) | IMAGE DATA (23) |
|---|---|---|
| (15000,18000,7000) | (-0.5,0,1.0) | TAKEN IMAGE 1 |
| (15000,18000,7000) | (1.0,1.0,-0.2) | TAKEN IMAGE 1 |

FIG.5

| KIND (31) | MODEL (32) | PHOTO-TAKING ANGLE (33) | IMAGE DATA (34) | DISTANCE (35) | HEAT INSULATING MATERIAL (36) |
|---|---|---|---|---|---|
| VALVE | EZB10A1100A | 45,45 | VALVE IMAGE 1 | | NONE |
| VALVE | 5FM2G0B120A | 120,30 | VALVE IMAGE 2 | | NONE |

FIG.6

| No. | SERVICE OR USE CONDITION | FLOOR HEIGHT | UPSTREAM PART | INSULATING MATERIAL THICKNESS |
|---|---|---|---|---|
| 1 | T > 50 | | | 400 |
| 2 | T > 50 | | SAFETY VALVE | 0 |
| 3 | T > 50 | FH < 2.5 | | 500 |
| 4 | T < 20 | | | 400 |
| 5 | T < 0 | FH < 2.5 | | 500 |
| 6 | T < 20 | | STOP VALVE | 0 |

41　42　43　44　45

IMAGE MATCHING DEVICE

This application is a continuation of application Ser. No. 10/100,179, filed Mar. 19, 2002, now abandoned.

BACKGROUND OF THE INVENTION

The present invention relates to an image matching device, and more particularly to an image matching device for matching to an actual object image an image synthesized based on three-dimensional data representative of plant equipment.

Image of layout of plant equipment such as piping, which image is formed by data such as of coordinates of positions of parts of the plant is imaged or displayed often different from the actual object image. This occurs if model data is not modified each time some alteration is made to the plant. In such a situation, such a model data cannot be used when some trouble occurs in the plant and it is necessary to detect errors involved in plant constructing works. Therefore, it is highly important to distinguish or detect differences between model data and actual objects data.

An example of a method for collating such plant equipment data with that of the actual plant to match data to actual state is disclosed in JP-A-9-81778. This method uses three-dimensional model data and a photograph of an object, and modifies the three-dimensional model data in accordance with the photographed object by comparing data thereof with transformation data, which has been obtained by transforming the model data with respect to positions corresponding to the taken or photographed or taken object.

The layout model data of a plant does not necessarily match or correspond to shape of the external appearance of the plant. For example, with the pipes that account for the greater part of the plant installation, most of the pipes are wound in practice by heat insulation material, but the model data does not include data on the heat insulation material.

Data regarding the equipment of complicated shapes, such as valves, is stored in the form of simple codes in order to reduce the amount of data. For this reason, accurate comparison cannot be achieved by simply comparing model data with a photograph representing a real or actual state of the plant.

SUMMARY OF THE INVENTION

An object of the present invention is to provide an image matching technique to accurately detect differences between model data and a picture of a real or actual object.

To achieve the above object, according to an aspect of the present invention, the following process is carried out. This technique first obtains three-dimensional model data including identification information about respective parts of an aggregate formed by a plurality of parts and information about their positions in a three-dimensional space, image data on an image taken of the aggregate, image information including information about the position of taking the image and information about the direction of taking the image, and parts information including image data on the parts. By using the three-dimensional model data and the parts information, an image of the aggregate is synthesized by taking a view of it from the same position at which the image of the aggregate has been taken. The image data on the image taken of the aggregate is collated with image data on the synthesized image, by which it becomes possible to detect differences between model data and a picture of the actual object with high accuracy.

Other objects, features and advantages of the invention will become apparent from the following description of the embodiments of the invention taken in conjunction with the accompanying drawings.

BRIEF DESCRIPTION OF THE DRAWINGS

FIG. 3 is a diagram showing an example of model data stored in a model data storage unit 10.

FIG. 4 is a diagram showing an example of image data stored in an image data storage unit 20.

FIG. 5 is a diagram showing an example of parts data stored in a parts library 30.

FIG. 6 is a diagram showing an example of heat insulating material stored in a heat insulating material library 40.

DESCRIPTION OF THE EMBODIMENTS

Figure 1:
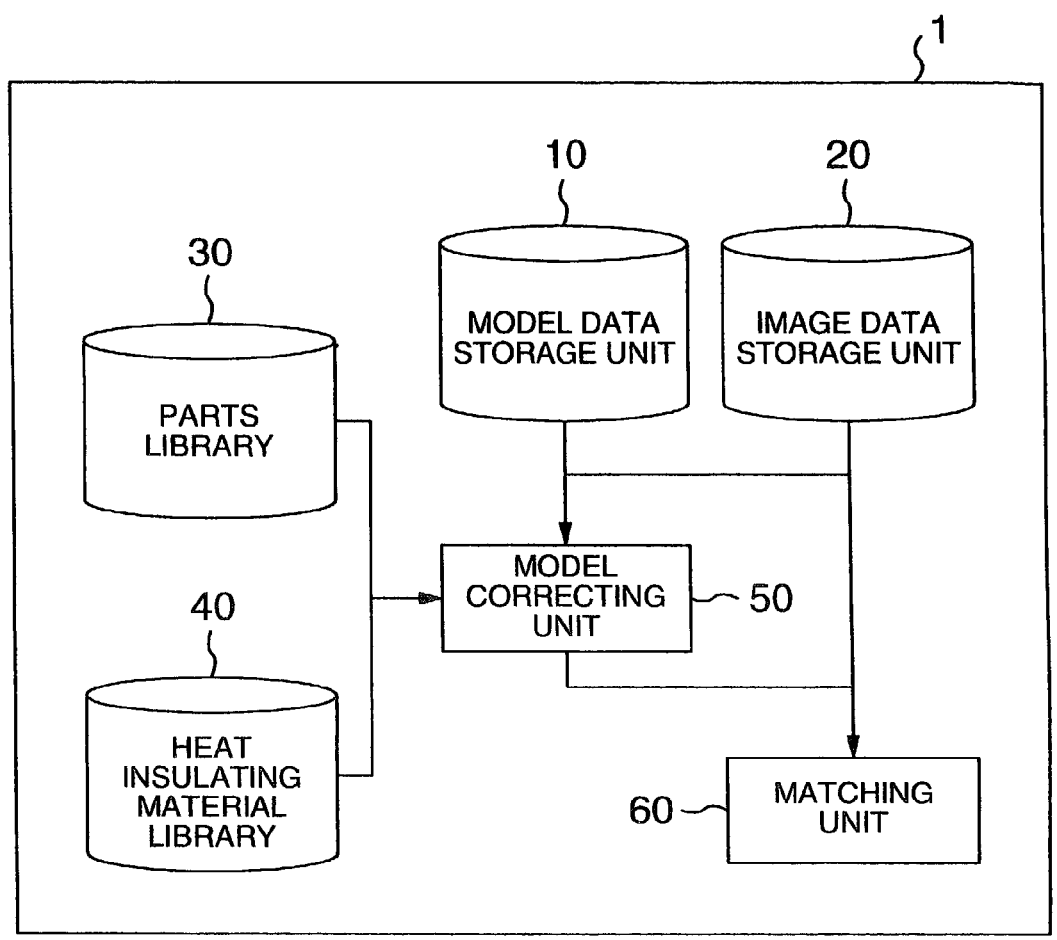
FIG. 1 is a diagram showing the structure of a plant three-dimensional image matching system 1 according to an embodiment of the present invention.

FIG. 1 shows an example of a structure of the functions of a plant three-dimensional image matching system 1 according to an embodiment of the present invention. The system according to this embodiment comprises a model data storage unit 10, an image data storage unit 20, a parts library 30, heat insulating material library 40, a model correction unit 50, and a matching unit 60.

This system can be realized by using an information process unit, such as a computer system. More specifically, as shown in FIG. 2, this system can be formed by a computer system, which has a central processing unit (CPU)) 203, a main memory unit 204, external memory units 206 and 207, an input unit 201, and a display unit 202 mutually connected through a bus line 205.

Figure 2:
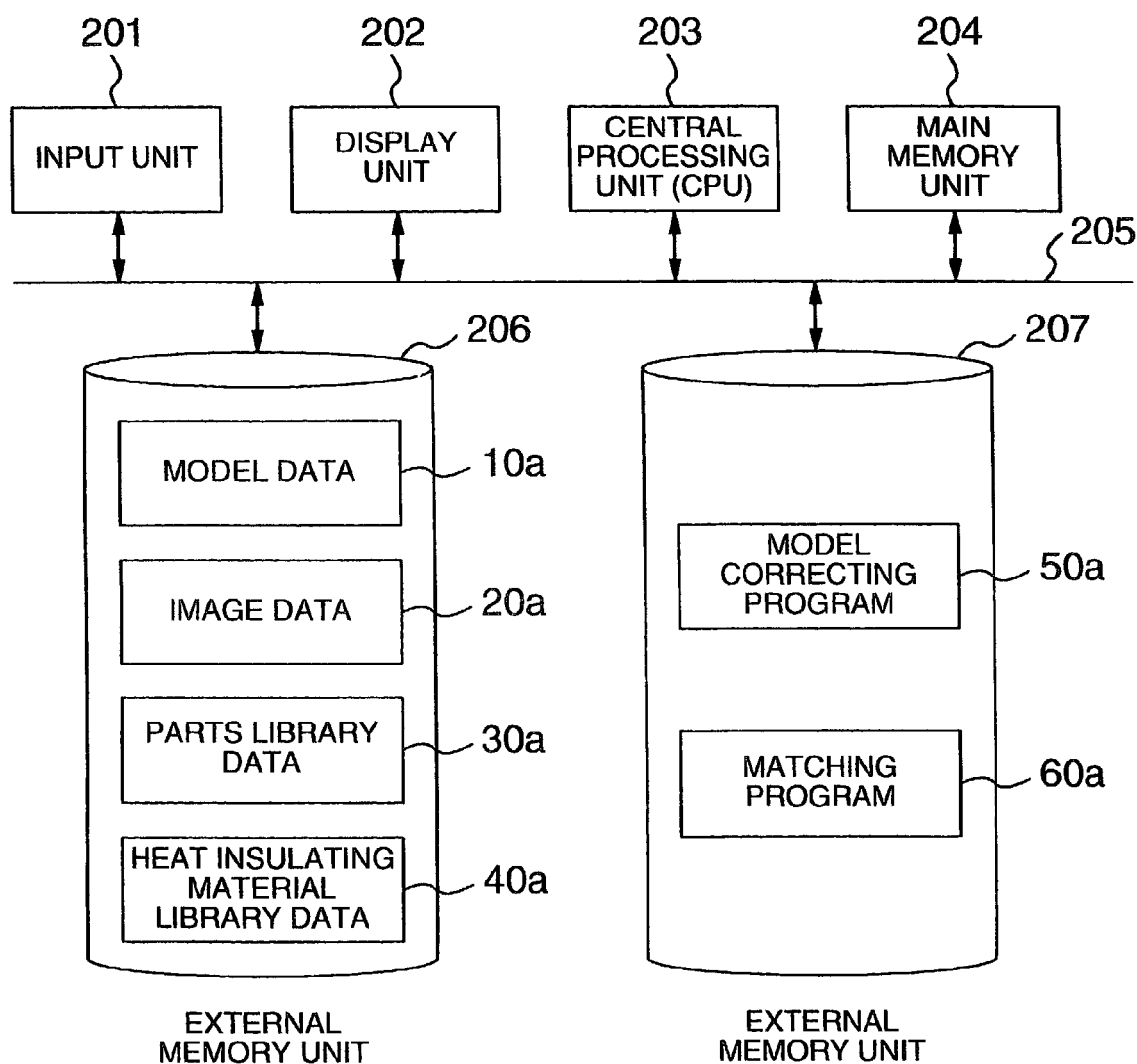
FIG. 2 is a diagram showing an example of hardware structure to realize the plant three-dimensional image matching system 1.

In the computer system in FIG. 2, the model data storage unit 10, the image data storage unit 20, the parts library 30, and the heat insulating material library 40, which are shown in FIG. 1, are formed in an external memory unit 206. The model correction unit 50 and the matching unit 60 shown in FIG. 1 are realized when a model correction program 50a and a collation program 60a stored in the external memory unit 207 are read into the main memory unit 204 under control of the CPU 203 and they are executed by the CPU 203.

It is possible to provide a plant three-dimensional image matching system by incorporating data stored in the external memory unit 206 and programs stored in the external memory unit 207 into the computer system including the input unit 201, the display unit 202, the CPU 203 and the main memory unit 204. This system can be formed by obtaining model data 10a, image data 20a, parts library data 30a, heat insulating material library data 40a, model correction program 50a, and collation program 60a from recording media, such as a CD-ROM, a flexible disk, and a DVD through a network and installing them into the computer system.

Description will now be made of various structures relating to the three-dimensional image matching system 1.

The model data storage unit 10 contains model data, including three-dimensional layout data of a plant, service conditions of the parts, and type data. Model data is input by application software of three-dimensional process CAD, for example. Model data may be divided into predetermined units (piping units, or certain ranges connected by welding or by flanges, for example), and separately stored in the model data storage unit 10.

FIG. 3 shows an example of model data. Description will be made referring, for example, to a plant formed by connecting parts and equipment, such as pipes, valves, pumps, etc., and a fluid flows through the pipes. Model data includes part ID 11, kind of part 12, type description in the same part kind 13, reference points 14 (reference point 1, reference point 2, reference point 3), diameter 15 showing pipe sizes, part model 16, service conditions 17, and insulation thickness 18.

The part ID 11 denotes information to uniquely identify any one of the parts, such as pipes and equipment. By the part ID 11, it is possible to know relations of parts to be joined in the plant. The part ID, for example, is described in a format of plant name—system name—system number—element number. The element numbers are assigned sequentially from upstream downwards.

The kind of part 12 denotes kinds of parts. For example, PIPE denotes straight pipes, ELBOW denotes elbows for pipe connection, REDUCER denotes reducers, VALVE denotes valves, and PUMP denotes pumps.

The reference points 14 denote the positions of each part of the plant, and include three reference points 1 to 3. Each of the reference points is expressed by three-dimensional coordinates (x, y, z) relative to a predetermined origin. The reference point 1 denotes the center point (start point) of the upstream side, and the reference point 2 denotes the center point (end point) of the downstream side. The reference point 3 denotes a point remotest from a straight line connecting the reference points 1 and 2. For example, for a curved pipeline, the reference point 3 denotes a point where the pipeline bends.

The service or use conditions 17 denote conditions for use of each part, such as kind, temperature, flow rate, pressure, etc. of the internal fluid. In the case shown in FIG. 3, the temperature (T), flow rate (v) and pressure (P) of the fluid flowing in the piping system are predetermined. The setting of the service conditions may be omitted.

The heat insulation thickness 18 indicates the thickness of heat insulating materials applied to pipelines and equipment. The heat insulating materials are materials to cover the parts. The insulation thickness 18 may not be set. If the heat insulation thickness is not set, whether or not a heat insulating material is applied or the thickness of the material is not unknown. If the heat insulation thickness is 0, this indicates that a heating insulating material is not applied.

The image data storage unit 20 stores image data obtained by taking a picture of the plant by a picture-taking device such as a camera. Image data 22 and data of the position 21 and direction 22 in which a picture was taken, as shown in FIG. 4 for example, are stored in the image data storage unit 20. The picture-taking position 21 shows the coordinates of the camera used to take an image of the object. The picture-taking direction 22 shows the direction of the camera when the image was taken. The image data is generated by using scanning data of a camera film, picture-taking data of a digital camera, or data on one frame of a moving picture taken by a video camera, for example.

The parts library 30 stores information about the parts, such as part models and image data, etc. Information about the kind 31, model 32, picture-taking angle 33, image data 34, distance 35, and heat insulating material 36, as shown in FIG. 5 for example, is stored in the parts library 30.

The model 32 shows particular identification names formed by a combination of a maker's name, a kind of part and a diameter, for example. The picture-taking angle 33 denotes an angle of line of sight when the image data 34 was captured, and it is expressed by a pair of an azimuth angle and an elevation angle. With regard to the coordinate axes, the flow direction is designated as the x-axis, the valve-stem direction is designated as the z-axis, and the axis which is perpendicular to those axes and which extends on the right side as viewed from the flow direction is designated as the y-axis. The angle of azimuth is an angle formed relative to the x-axis in the x-y plane, and the angle of elevation is an angle formed relative to the x-axis in the x-z plane. The image data 34 stores image data on equipment whose image was taken at the specified picture-taking angle 33. The distance 35 indicates a distance between the object equipment and the picture-taking angle. The setting of the distance 35 may be omitted. The heat insulating material 34 indicates whether or not the image is of the equipment wound by a heat insulating material.

Data stored in the parts library 30 may be so arranged as to be updated to latest data through communication lines, such as Internet. In addition, the parts library 30 may be located in a remote place and referred to through communication lines.

The heat insulating material library 40 stores conditions for applying a heat insulating material and the thickness of the material used. Insulating material ID 41, service condition 42, floor height 43, upstream-side device 44, and heat insulation thickness 45, as shown in FIG. 6 for example, are stored in the heat insulating material library 40.

The service condition 42 indicates the temperature condition of the internal fluid, the floor height 43 indicates the condition for the height from the floor, the upstream-side device 44 indicates the condition for the kind of part located upstream, respectively. The heat insulation thickness 45 indicates the thickness of a heat insulating material applied when the conditions are met.

The heat insulating material library data may be edited by the user or may be updated by entry of data through networks, such as the Internet.

The model correction unit 50 corrects model data based on image data, parts library data, and heat insulating material library data. The model correction unit 50 generates a synthesized image based on corrected model data.

Figure 7:
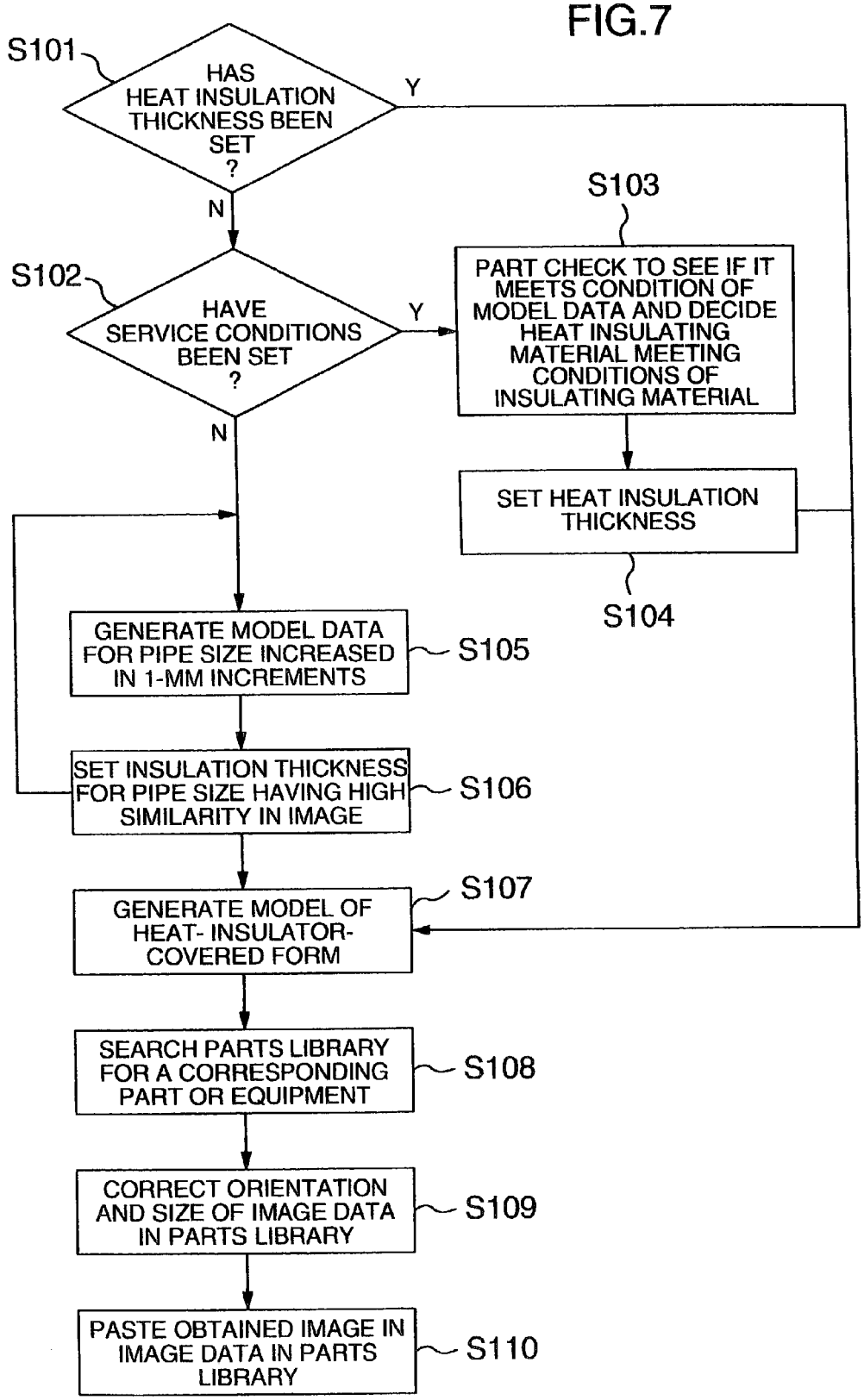
FIG. 7 is a flowchart showing steps of a model correction process.

The user selects image data as the reference for comparison (hereafter referred to as reference image data) out of image data stored in the image data storage unit 20. The model correction unit 50 determines object parts which are to be included in an image when an image is taken in the same position and direction as the picture-taking position 21 and the picture-taking direction 22 of selected reference image data. In other words, the object parts are the same as those in the reference image. With regard to the object parts, the model correction unit 50 performs steps shown in FIG. 7 in the order from upstream downwards.

By referring to the model data storage unit 10, the model correction unit 50 decides whether or not the heat insulation thickness 18 of the object part has been set (S101). If data has been set in the insulation thickness 18 (including a case when 0 is set), the process proceeds to a step S107.

If there is set no data of the heat insulation thickness 18, the model correction unit 50 decides whether or not the service conditions have been set for the object part (S102).

If the service conditions 17 have been set, the model correction unit 50 refers to or searches into the insulating material library 40, and decides the kind of a heat insulating material and its thickness suitable for the part, and corrects model data (S103, S104).

More specifically, the model correction unit 50 compares the service conditions 17 for the part and the service condition 42 in the heat insulating material library (S103). If temperature has not been set in the service conditions 17, the temperature in the service conditions 17 of a piping part one piece on the upstream side from the piping part concerned may be substituted. The model correction unit 50 checks the floor height 43 in the heat insulating material library to obtain a floor height from the reference points 14 of the part concerned. In other words, if the reference point 1 of the reference points 14 of the object piping part is (x1, y1, z1), data, included in model data and having CONC set as the kind of part, which is the first data to intersect a segment connecting (x1, y1, z1) and (x1, y1, z0), is searched. Here, CONC as the kind of part indicates that the floor of the plant is made of concrete. More specifically, the distance from this intersection to the point (x1, y1, z1) is the distance from that part to its nearest floor, namely, the height of the floor. Note that the reference point 1 of a part concerned is designated as a reference used as a base to measure its height though the part may sometimes be inclined. The model correction unit 50 identifies an upstream-side device according to or from part ID 11, and collates it with upstream-side devices 44 in the heat insulating material library. The upstream-side device is identified as a part which has an ID 11 that includes an element number smaller by one than that of the part concerned. When an upstream-side device that meets the specified conditions, this is determined as a right upstream device, and accordingly the kind and the thickness of a heat insulating material for the part concerned are decided. If there are a plurality of heat insulating materials that meet the conditions, a heat insulating material with a largest heat insulating material ID 41 is selected. The insulation thickness 45 in the heat insulating material library is set as the insulation thickness 18 of the part under discussion (S104). If there is not any data on a heat insulating material that meets the conditions, the insulation thickness 18 is set to 0.

In the step S102, if no data has been set in the service condition 17, the model correction unit 50 carries out a process of estimating the insulation thickness by using a reference image, and corrects model data (S105, S106).

More specifically, model data is prepared which is applicable to the object pipe, the pipe diameter of which is increased in 1-mm increments (S105). Next, a synthesized image is generated based on this model data, and the synthesized image is collated with a reference image. One-half of an increase in pipe diameter when there is the highest degree of similarity between the two images is set as the insulation thickness (S106). The insulation thickness is 0 when a synthesized image based on model without any increase in pipe diameter has the highest degree of similarity.

Here, based on process results up to the step S106, the model correction unit 50 generates a heat-insulator-covered form model (S107). For example, a total of pipe diameter before correction added with twice the thickness of a heat insulating material is substituted for a new pipe diameter.

Then, a synthesized image is prepared using model data corrected in the process up to the step S107 (S108–S110). More specifically, for object parts, such as valves, image data of which has been recorded in the parts library 30, image data 34 is obtained from the parts library 30 according to part models (S108). In the above step, either of image showing an object covered with a heat insulating material or image showing an object without any insulating material is obtained depending on whether a heat insulator is used or not.

The image data 34 from the parts library 30 is corrected in terms of size or orientation in accordance with the reference image (S109). More specifically, the angle of line of sight is calculated based on the picture-taking position 21 and the picture-taking direction 22 of the reference image, and the reference points 14 showing the position of the object part. In other words, the angle of line of sight is expressed by the horizontal and vertical components of an angle formed by a vector connecting the position of viewpoint (picture-taking position 21) and the coordinates of the center of the object equipment, and the picture-taking direction of image data, where the horizontal component is an angle of azimuth and the vertical component is an angle of elevation. By using this angle of line of sight, image data of the part corresponding to this angle is obtained. In other words, the model correction unit 50 searches the parts library 30 for an image whose angle of line of sight coincides with or almost coincides with the picture-taking angle 33 of the image of the part stored in the parts library 30. If there is not any such image, assuming symmetry of an image, an image for which the angle of azimuth is AZ±180° if the azimuth angle is designated by AZ or a left-right reversed image of an image for which the azimuth angle is 180−2*AZ is obtained as a result of search.

Thus, the obtained image is inserted into the synthesized image (S110). Projection transformation is carried out on model data so as to match the viewpoint position and the line-of-sight direction of image data to thereby obtain a two-dimensional image. At this time, the two-dimensional image as the search result is arranged at the center position in place of the part as the object. By those steps, based on model data, an image is synthesized (hereafter referred to as a synthesized image) reflecting changes in thickness of pipes and parts depending on the presence or absence of heat insulating material and containing detailed features of the equipment.

The matching unit 60 collates synthesized image data generated by the model correction unit 50 with reference image data selected by the image data storage unit 20, and extracts differences. The matching unit 60 reads reference image data and synthesized image data, and compares the density of the pixels of the two images. The density is compared by gray-scale representation of the colors of the pixels, and differences in gray-scale value of the pixels are calculated. The matching unit 60 conducts this calculation on all pixels, and determines the areas where the difference threshold value of 10 is exceeded among 5×5 or larger adjacent-pixel-areas, and outputs those areas as divergence areas. The output method is to output an image formed of gray-scale values based on the difference values, or an image formed by superposing an image having the gray-level values set in R values of RGB specification on the image data.

According to another embodiment of the present invention, it is possible to provide three-dimensional data process service by using image matching service means which accepts image data or model data from customers through networks, returns the customers collation results output from the above-mentioned matching means 60, and outputs customer names, process dates and times, and numbers of data.

Figure 8:
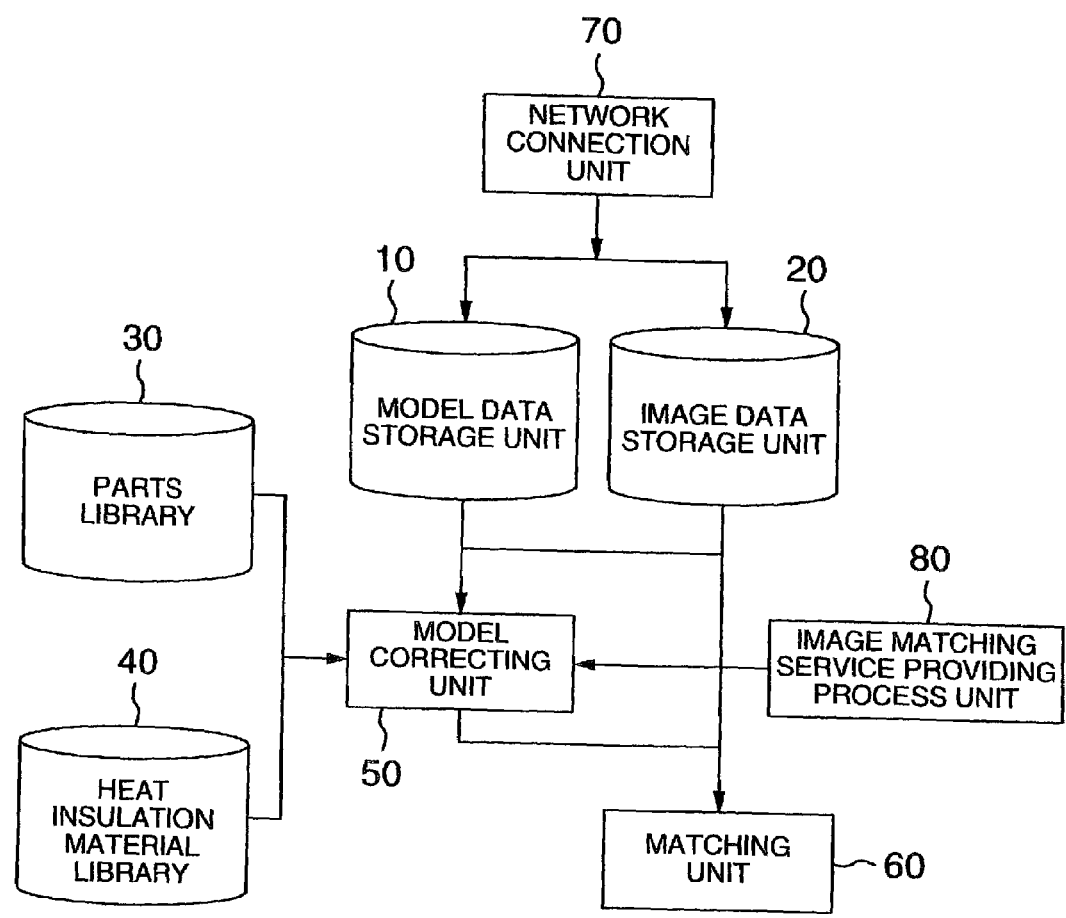
FIG. 8 is a diagram showing the structure of a plant three-dimensional image matching service system 8 according the embodiment of the present invention.

FIG. 8 shows an example of a whole structure of a plant three-dimensional image matching service system 8 as mentioned above. The plant three-dimensional image matching service system 8 comprises a network connection unit 70 and a matching service providing service 80 in addition to the plant three-dimensional image matching system 1.

The network connection unit 70 conforms to the network data transfer methods, such as e-mail, WWW, etc., connects to networks, such as the Internet or an intranet, and outputs and receives data. The user, through this network connection unit 70, transmits a user name, image data of plant facilities, and plant model data. The image matching service providing process unit 80 receives image data and model data from the network connection unit 70, and stores the data in the model data storage unit 10 and the image data storage unit 20. The image matching service providing process unit 80 activates the model correction unit 50 and the matching unit 60, and obtains process results.

The image matching service providing process unit 80 sends the user image matching results through the network connection unit 70. Simultaneously, the image matching service providing process unit 80 records the user name, the number of images processed, and process date and time in the internal memory area of the service providing process unit 80. The recorded data, such as the user names, the numbers of images, and dates and times, can be output to the display unit at one's discretion. Therefore, it is possible to check service execution records, and manage accounts of service fees.

The system structures mentioned in the foregoing embodiments may be changed or added or omitted in any feasible combinations.

According to the present invention, differences between images true to actuality of objects and model data can be extracted with high accuracy.

It should be further understood by those skilled in the art that the foregoing description has been made on embodiments of the invention and that various changes and modifications may be made in the invention without departing from the spirit of the invention and the scope of the appended claims.

What is claimed is:

1. An image matching device comprising:
a three-dimensional model data memory unit for storing identification information for each of a plurality of parts forming an aggregate and information concerning positions of said parts in three-dimensional space;
a parts data memory unit for storing data characterizing said parts;
an image data memory unit for storing image data defining an image taken of said aggregate, information concerning a position at which said image was taken and a direction in which said image was taken, the stored image data and the stored information concerning position and direction being associated one another and stored;
image synthesizing means for producing a synthesized image as viewed from a position and in a direction which are the same as those of an image stored in said image data memory unit, by referring to said three-dimensional model data memory unit and said parts data memory unit;
means for matching image data of the produced synthesized image to image data of an image stored in said image data memory unit; and
model correcting means for correcting three-dimensional model data of pipe diameter stored in said three-dimensional model data memory unit, said image synthesizing means generating a synthesized image by using three-dimensional model data corrected by said model correcting means.

2. An image matching device comprising:
a three-dimensional model data memory unit for storing identification information for each of a plurality of parts forming an aggregate and information concerning positions of said parts in three-dimensional space;
a parts data memory unit for storing data characterizing said parts;
an image data memory unit for storing image data defining an image taken of said aggregate, information concerning a position at which said image was taken and a direction in which said image was taken, the stored image data and the stored information concerning position and direction being associated one another and stored;
image synthesizing means for producing a synthesized image as viewed from a position and in a direction which are the same as those of an image stored in said image data memory unit, by referring to said three-dimensional model data memory unit and said parts data memory unit;
means for matching image data of the produced synthesized image to image data of an image stored in said image data memory unit; and
model correcting means for correcting three-dimensional model data stored in said three-dimensional model data memory unit, said image synthesizing means generating a synthesized image by using three-dimensional model data corrected by said model correcting means;
wherein, when a covering material is applied to each of said parts, said three-dimensional model data memory unit further stores information of thickness of said covering material; and
wherein said model correcting means corrects said three-dimensional model data based on the information of the thickness of said covering material.

3. An image matching device comprising:
a three-dimensional model data memory unit for storing identification information for each of a plurality of parts forming an aggregate and information concerning positions of said parts in three-dimensional space;
a parts data memory unit for storing data characterizing said parts;
an image data memory unit for storing image data defining an image taken of said aggregate, information concerning a position at which said image was taken and a direction in which said image was taken, the stored image data and the stored information concerning position and direction being associated one another and stored;
image synthesizing means for producing a synthesized image as viewed from a position and in a direction which are the same as those of an image stored in said image data memory unit, by referring to said three-dimensional model data memory unit and said parts data memory unit;
means for matching image data of the produced synthesized image to image data of an image stored in said image data memory unit;
model correcting means for correcting three-dimensional model data stored in said three-dimensional model data memory unit, said image synthesizing means generating a synthesized image by using three-dimensional model data corrected by said model correcting means; and
a covering material information memory unit for storing information showing conditions for using a covering material for each of said parts;

wherein said three-dimensional model data memory unit further stores information of conditions for using each of said parts; and wherein said model correcting means corrects three-dimensional model data based on the information of said conditions for using said covering material by referring to said covering material information memory unit.

4. An image matching device comprising:

a three-dimensional model data memory unit for storing identification information for each of a plurality of parts forming an aggregate and information concernina positions of said parts in three-dimensional space:

a parts data memory unit for storing data characterizing said parts;

an image data memory unit for storing image data defining an image taken of said aggregate, information concerning a position at which said image was taken and a direction in which said image was taken, the stored image data and the stored information concerning position and direction being associated one another and stored;

image synthesizing means for producing a synthesized image as viewed from a position and in a direction which are the same as those of an image stored in said image data memory unit, by referring to said three-dimensional model data memory unit and said parts data memory unit;

means for matching image data of the produced synthesized image to image data of an image stored in said image data memory unit; and model correcting means for correcting three-dimensional model data stored in said three-dimensional model data memory unit, said image synthesizing means generating a synthesized image by using three-dimensional model data corrected by said model correcting means, wherein said model correcting means corrects orientation and size of image data in said parts data memory, and inserts an obtained image into the synthesized image.

* * * * *